C. D. MALCOLM.
SAFETY DRIVE DEVICE.
APPLICATION FILED SEPT. 7, 1915.

1,179,948.

Patented Apr. 18, 1916.

INVENTOR
Carlos D Malcolm,
By Owen, Owen & Crampton,
His attys.

UNITED STATES PATENT OFFICE.

CARLOS D. MALCOLM, OF FINDLAY, OHIO, ASSIGNOR TO THE BUCKEYE TRACTION DITCHER COMPANY, OF FINDLAY, OHIO, A CORPORATION OF OHIO.

SAFETY DRIVE DEVICE.

1,179,948.

Specification of Letters Patent.

Patented Apr. 18, 1916.

Application filed September 7, 1915. Serial No. 49,315.

*To all whom it may concern:*

Be it known that I, CARLOS D. MALCOLM, a citizen of the United States, and a resident of Findlay, in the county of Hancock and State of Ohio, have invented a certain new and useful Safety Drive Device; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to a safety sprocket or other rotatable driven member, and has more particularly for its object the provision of a safety device for use in connection with excavating wheels of the rotary type, whereby to protect the driving mechanism for the wheel from breaking when some obstruction, such as a large stone, root or other firmly anchored member is encountered thereby.

The invention is fully described in the following specification, and while, in its broader aspect, it is capable of embodiment in numerous forms, a preferred embodiment thereof is illustrated in the accompanying drawings, in which,—

Figure 1:
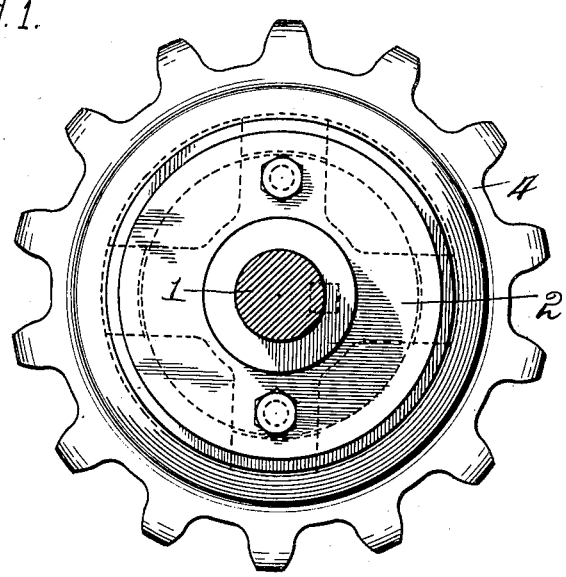
Figure 2:
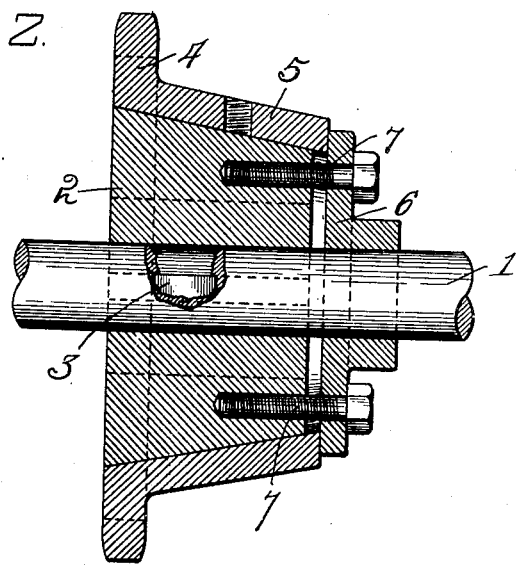

Figure 1 is a side elevation, and Fig. 2 is a sectional view of a device embodying my invention mounted on a shaft.

Referring to the drawings, 1 designates a shaft, and 2 a sleeve, preferably of a hardened nature, which is fixed against rotation relative to the shaft by a key 3, or this may be accomplished in any other suitable or convenient manner. The outer periphery of the sleeve 2 is of conical form for the whole or at least a part of its width.

The member, which is intended to communicate rotation thereto or from the shaft 1, in the present instance, comprises a sprocket wheel 4, the hub of which is extended from at least one side thereof in the form of a sleeve 5. The hub opening or interior of the sleeve 5 is of conical form to conform to the outer conical periphery of the sleeve 2 and is intended to fit over said sleeve as shown. A collar 6 is loosely mounted on the shaft 1 at the small end of the sleeve 2 and is intended to have contact adjacent to its outer edge with the small end of the sleeve 5, which end projects beyond the small end of the sleeve 2 when said sleeves are mounted one on the other. Screws 7 project through apertures in the collar 6 and thread into the small end of the sleeve 2. These screws anchor the collar 6 against outward movement relative to the sleeve 2 and also, when turned in one direction, cause an outward forcing of the sleeve 5 on the sleeve 2 and a consequent frictional binding therebetween as is apparent. The binding action of the member 4 on the sleeve 2 is preferably such that upon encountering an abnormal resistance to an operating of the parts with which the member 4 is connected, such member is permited to turn on the sleeve 2 and allow the parts driven thereby to remain at rest.

It is evident that the safety device embodying my invention is automatic in its action and provides a simple and efficient means for causing an operation of the driven parts under normal working conditions, and permits them to remain at rest or substantially so when an abnormal strain is encountered thereby.

I wish it understood that my invention is not limited to any specific construction, arrangement or form of the parts except in so far as such limitations are specified in the claims.

Having thus described my invention, what I claim as new, and desire to secure by Letters Patent, is,—

1. A safety device of the class described comprising, in combination, a shaft, a conical sleeve keyed to said shaft, a power transmitting member having a conical hub opening complemental to and mounted on said sleeve, a collar loosely mounted on the shaft at the small end of said sleeve and for contact with the small end of the member hub, and means connecting said collar and sleeve and operable to vary the pressure of said collar against the hub end of said member.

2. A safety device of the class described comprising, in combination, a shaft, a conical sleeve keyed to said shaft, a power transmitting member having a sleeve like hub provided with a conical opening for receiving said sleeve, said member hub at the small end of said opening projecting beyond the small end of the sleeve, a collar loosely encircling said shaft at the small end of the sleeve and bearing at its inner side against the adjacent end of said member hub, and screws connecting said collar and sleeve and operable in cooperation with said collar to vary the frictional binding action of said member on said sleeve.

In testimony whereof, I have hereunto signed my name to this specification.

CARLOS D. MALCOLM.